(12) United States Patent
Matsuoka et al.

(10) Patent No.: US 6,952,249 B2
(45) Date of Patent: *Oct. 4, 2005

(54) COLOR LIQUID CRYSTAL DISPLAY

(75) Inventors: Hideki Matsuoka, Gifu (JP); Kazuyuki Maeda, Aichi-ken (JP); Susumu Oima, Gifu-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 45 days.

This patent is subject to a terminal disclaimer.

(21) Appl. No.: 10/648,431

(22) Filed: Aug. 26, 2003

(65) Prior Publication Data

US 2004/0046901 A1 Mar. 11, 2004

Related U.S. Application Data

(63) Continuation of application No. 09/500,114, filed on Feb. 8, 2000, now Pat. No. 6,639,640.

(30) Foreign Application Priority Data

Feb. 10, 1999 (JP) .............................................. 11-32819

(51) Int. Cl.$^7$ ............................................. G02F 1/1337
(52) U.S. Cl. ........................ 349/129; 349/106; 349/139
(58) Field of Search ................................. 349/106, 129, 349/139

(56) References Cited

U.S. PATENT DOCUMENTS

| 5,585,951 A | * 12/1996 | Noda et al. .................. 349/122 |
| 5,666,179 A | 9/1997 | Koma |
| 5,818,550 A | * 10/1998 | Kadota et al. ................ 349/43 |
| 5,905,548 A | * 5/1999 | Shimada ...................... 349/38 |
| 5,953,085 A | * 9/1999 | Shimada ...................... 349/39 |
| 6,031,512 A | * 2/2000 | Kadota et al. ................ 345/88 |
| 6,038,006 A | * 3/2000 | Sasaki et al. ............... 349/106 |
| 6,365,916 B1 | * 4/2002 | Zhong et al. ................ 257/59 |
| 6,369,870 B1 | 4/2002 | Koma |
| 6,639,640 B1 | * 10/2003 | Matsuoka et al. .......... 349/139 |
| 6,661,488 B1 | 12/2003 | Takeda et al. |
| 6,724,452 B1 | 4/2004 | Takeda et al. |

FOREIGN PATENT DOCUMENTS

| JP | 09-146124 | 6/1997 |
| JP | 10-301112 | 11/1998 |

* cited by examiner

*Primary Examiner*—Kenneth Parker
(74) *Attorney, Agent, or Firm*—Hogan & Hartson, LLP (57) ABSTRACT

In a liquid crystal display having liquid crystal sealed between first and second substrates opposing one another, the first substrate is provided with data lines (56) formed overlapping pixel electrodes (58). By forming color filters (1) in a layer between the data lines (56) and the pixel electrodes (58), the distance between the data lines (56) and the pixel electrodes (58) is increased, reducing parasitic capacitance generated therebetween. Effective voltage application to the pixel electrodes (58) is thereby accomplished, allowing increase in contrast. No decrease in transmittance is caused because the thickness of the planarizing film (2) is not increased.

18 Claims, 7 Drawing Sheets

COLOR LIQUID CRYSTAL DISPLAY

This is a continuation of application Ser. No. 09/500,114 filed Feb. 8, 2000 now U.S. Pat. No. 6,639,640, which application is hereby incorporated by reference in its entirety.

BACKGROUND OF THE INVENTION

1. Field of the Invention

The present invention relates to a liquid crystal display (LCD), and more particularly to improving image display of a LCD in which a source line is formed overlapping pixel electrodes.

2. Description of the Related Art

A vertical orientation type LCD comprising liquid crystal having negative anisotropy of dielectric constant and a vertical orientation film has been proposed in, for example, JPA H06-301036. An LCD of this type is described below.

Figure 1A:
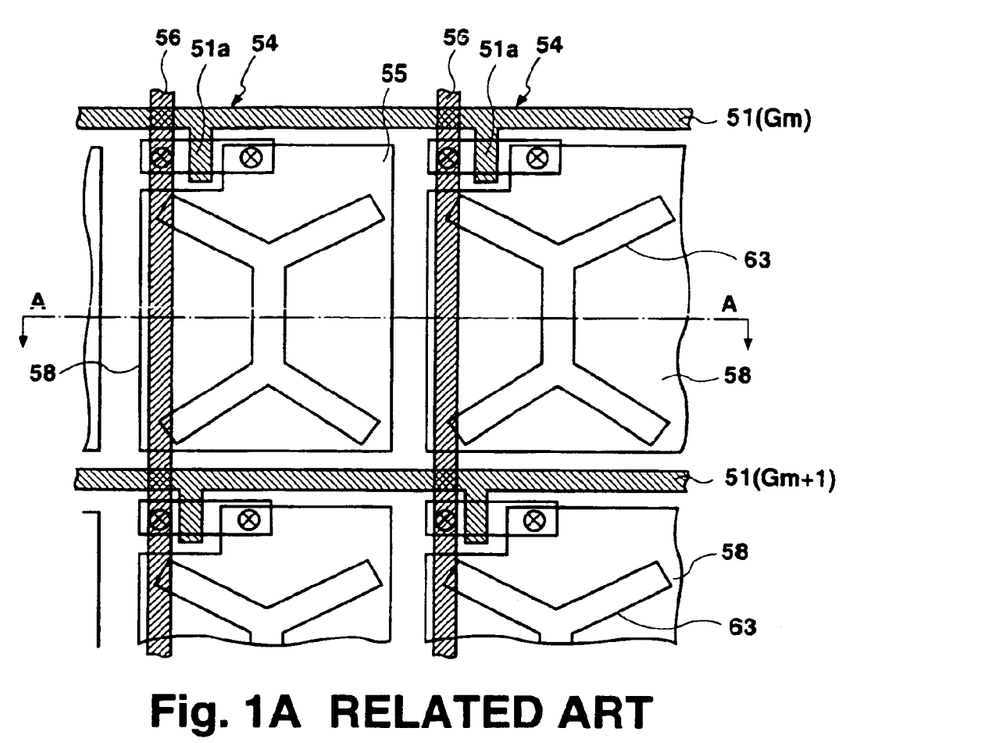
FIG. 1A is a plan view of a related liquid crystal display.
Figure 1B:
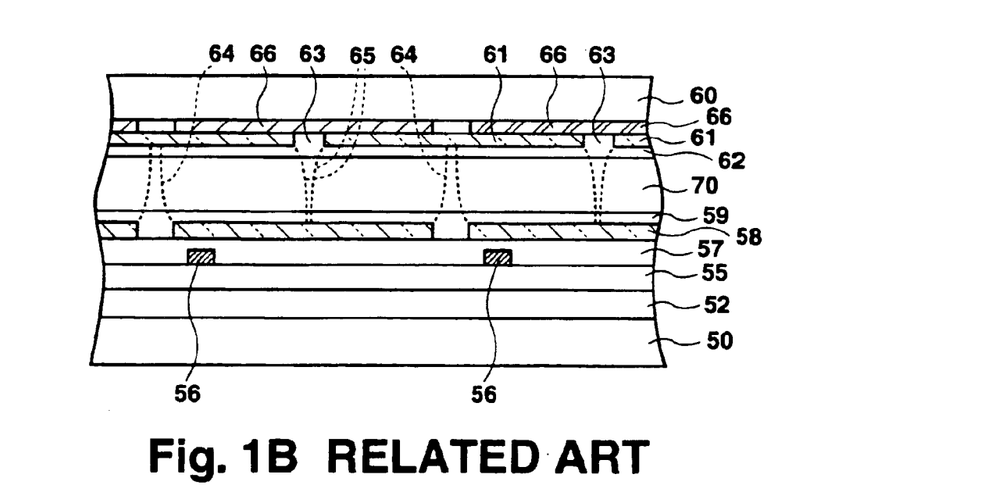
FIG. 1B is a cross-sectional view taken along line A—A of FIG. 1A.

FIG. 1A is a plan view showing such a LCD, and FIG. 1B shows a cross-sectional view taken along line A–A' of FIG. 1A. A gate line 51 is formed on a first substrate 50, and a gate insulating film 52 is formed covering the gate line 51. The gate line 51 comprises gate electrodes 51a within a portion of each pixel. Over these portions, poly-silicon film is provided in the form of discrete islands so as to cross over the gate electrodes 51a. The poly-silicon film is then doped with impurities to create, together with the gate electrodes 51a, thin film transistors (TFT) 54. An interlayer insulating film 55 is formed over these components, and a data line 56 is superimposed on the interlayer insulating film 55. Subsequently provided is a planarizing film 57, and pixel electrodes 58 composed of ITO (indium tin oxide) are formed thereon. Each pixel electrode 58 is connected to a TFT 54 via a contact hole opened through the interlayer insulating film 55 and the planarizing film 57. The data line 56 is formed overlapping under the pixel electrode 58. The data line 56 is connected to the source regions of the TFTs 54 and supplies electric charges to the pixel electrodes 58 when the gate electrodes 51a are turned on. Formed over the pixel electrodes 58 is a vertical orientation film 59 made of an organic material such as polyimide or of an inorganic silane material. Rubbing processing is not performed on the vertical orientation film 59.

Provided on a second substrate 60 arranged opposing the first substrate 50 are color filters 66 in positions corresponding to the pixel electrodes 58. Each color filter is colored either one of red (R), green (G), and blue (B), or alternatively, cyan, magenta, and yellow. Over the color filters 66, a common electrode 61 composed of ITO or a similar material is formed extending in a region over a plurality of pixel electrodes 58. A vertical orientation film 62 identical to the one disposed on the first substrate 50 is provided over the common electrode 61. Orientation control windows 63, i.e. regions where no electrode is present, are formed in the common electrode 61. The orientation control windows 63 may have a shape of two letter Y's connected at their bottoms.

Liquid crystal 70 is sealed between the first and second substrates 50,60. The orientation of liquid crystal molecules is controlled in accordance with the strength of electric field generated by a voltage applied between the pixel electrodes 58 and the common electrode 61. On the outer side of the first substrate 50 and the second substrate 60, polarizers (not shown) are arranged such that their polarization axes are perpendicular to one another. Linearly polarized light that travel between the polarizers is modulated while passing through the liquid crystal 70 controlled to different orientations in the respective display pixels. The light is thereby controlled to achieve desired transmittance.

The liquid crystal 70 has negative anisotropy of dielectric constant. That is, the liquid crystal 70 has the property to orient such that the longitudinal axes of its molecules become perpendicular to the direction of the electric field. The vertical orientation films 59,62 control the initial orientation of the liquid crystal 70 to the vertical direction. When no voltage is applied, the liquid crystal molecules are oriented vertically with respect to the plane of the vertical orientation films 59,62. In this case, the linearly polarized light that has passed through one of the polarizers passes through the liquid crystal layer 70, but is obstructed by the other polarizer. The resulting display is seen as black.

In the above-described arrangement, a voltage is applied between a pixel electrode 58 and the common electrode 61 to generate electric fields 64,65 which tilt the liquid crystal molecules. At end portions of the pixel electrode 58, electric field 64 curves from the pixel electrode 58 towards the common electrode 61. Similarly due to the absence of any electrodes, electric field 65 curves towards the pixel electrode 58 at edges of an orientation control window 63. The curved electric fields control the orientation of the liquid crystal by tilting the molecules towards the inboard of the pixel electrode 58 and towards the orientation control window 63.

In regions directly underneath orientation control windows 63, no electric field is generated during voltage application because the common electrode 61 is absent. Liquid crystal molecules are therefore fixed in the initial orientation state, namely, the vertical direction. This allows regions of the liquid crystal on the respective sides of the orientation control window 63 to be oriented in opposing directions due to the continuous property of liquid crystal. As a result, a display with a broad viewing angle can be obtained.

The controller of the liquid crystal orientation is not limited to orientation control windows 63. Alternatively, slope portions may be disposed in the vertical orientation films 59, 62 on the sides contacting the liquid crystal 70. Details concerning this point are found in Japanese Patent Application No. Hei 6-104044 (JPA H07-311383) filed by the present applicant.

Figure 2:
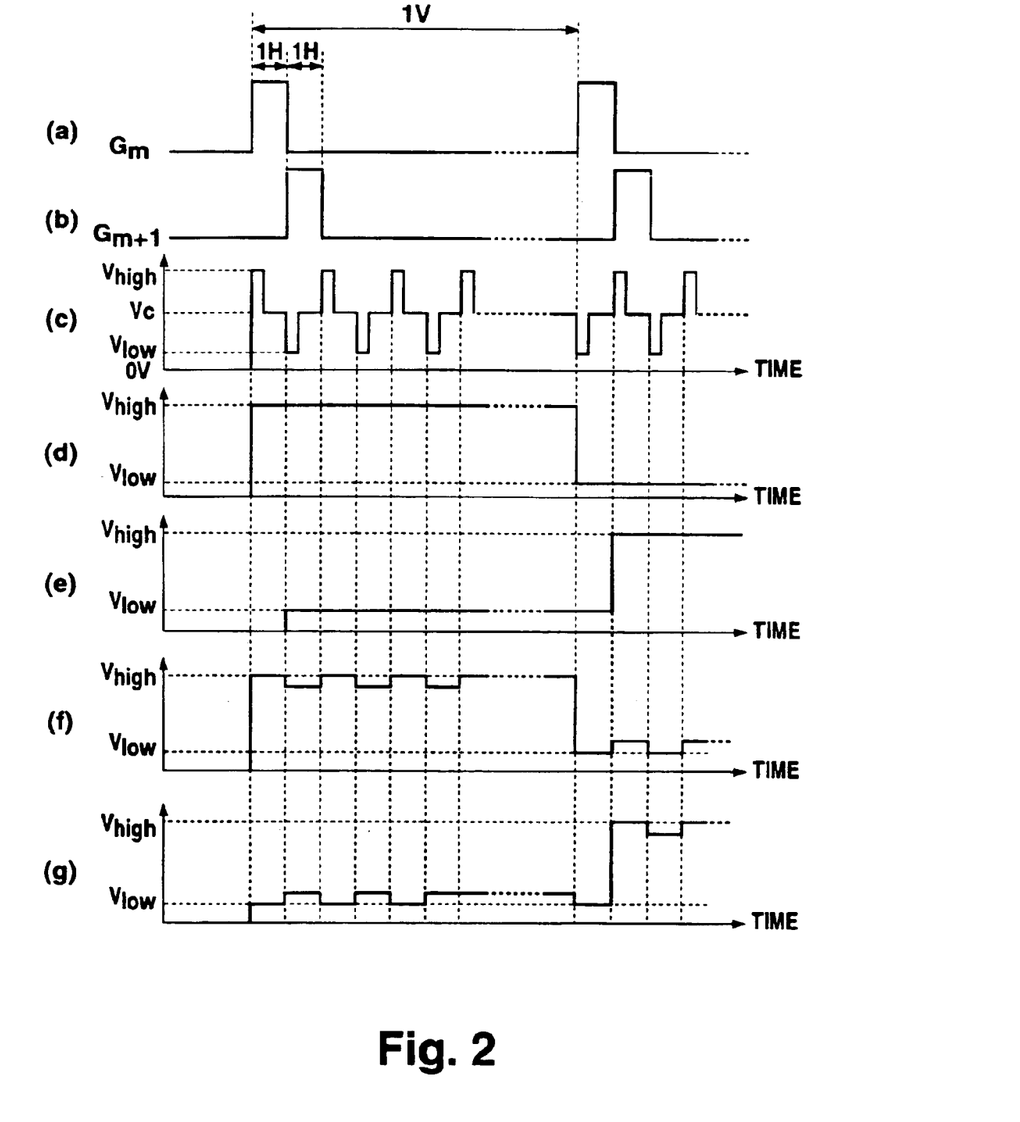
FIG. 2 is a timing chart illustrating voltage application in a liquid crystal display according to the line inversion scheme.

The voltage application scheme of the LCD is next explained. FIG. 2 is a timing chart showing voltages applied to gate lines 51 and data lines 56, and voltages of pixel electrodes driven by those applied voltages. FIGS. 2(a), 2(b), and 2(c) illustrate the voltages applied to mth gate line, m+1th gate line, and a data line, respectively. FIG. 2(d) indicates the voltage of a pixel electrode controlled by the mth gate line and the data line. FIG. 2(e) indicates the voltage of a pixel electrode controlled by the m+1th gate line and the data line. During one horizontal synchronization period (referred to hereinafter as 1H), a voltage is applied to the mth gate line to switch it on. When the mth gate line is switched on, TFTs of pixel electrodes in the associated row are accordingly turned on. During 1H, voltages according to an image to be displayed are applied to the respective data lines, and each of these voltages is retained by a pixel electrode in that row. In the next 1H, the mth gate electrodes are turned off while the m+1th gate electrodes are turned on. Accordingly, TFTs of pixel electrodes associated with the m+1th gate electrodes are turned on. Voltages in the data lines 56 are then retained by the pixel electrodes in this row. Similar procedures are repeated to apply voltages to each row of pixel electrodes 58 and to drive associated liquid crystal, thereby displaying an image. During these procedures, the direction of electric field is inverted for each adjacent rows to prevent degradation of liquid crystal. Specifically, the pixel electrodes in the row controlled by mth gate line may be applied with voltage $V_{high}$ (10V) higher than the potential Vc of the common electrode 63 (6V, for example) by a predetermined potential (4V, for example), while applying an inverted voltage $V_{low}$ (2V), i.e. a voltage lower than the potential Vc of the common electrode 63 by the predetermined potential, to the pixel electrodes of the adjacent row. When again applying a voltage to the pixel electrodes of the row associated with mth gate line, the inverted voltage of the previously applied voltage, namely, $V_{low}$, is applied. Such a voltage application scheme is referred to as the line inversion scheme. As the voltages applied to the pixel electrodes are alternately inverted for each row using the potential Vc of the common electrodes 63 as the point of inversion, the electric fields generated according to the line inversion scheme have uniform shapes with inverted directions for each row.

As mentioned above, data lines 56 overlap pixel electrodes 58 in a vertical orientation type LCD, generating parasitic capacitance $C_{SD}$ between the data lines 56 and the pixel electrodes 58. Further, when employing the line inversion scheme, each data line 56 is applied with voltages similar to an alternating current as shown in FIG. 2(c). Such voltages of the data line 56 affect the pixel lectrodes 58 as noise. As a result, voltages retained by the pixel electrodes 58 cannot be maintained at the values of $V_{high}$ or $V_{low}$ applied, and receive influences from the voltages applied to the data line 56 as shown in FIGS. 2(f) and 2(g). The voltages retained by the pixel electrodes 58 would therefore be at values substantially lower than $V_{high}$ or higher than $V_{low}$, and accordingly, a significant reduction in potential difference between the pixel electrodes 58 and the common electrode 61 cannot be avoided.

When the potential difference between the pixel electrodes 58 and the common electrode 61 is reduced, an electric field of sufficient strength cannot be applied to the liquid crystal 70. The contrast of the LCD would then degrade due to insufficient driving of the liquid crystal.

The present applicant proposed in Japanese Patent Application No. Hei 10-337840 a technique of arranging data signal lines 56 for supplying display signals to the pixel electrodes 58 via thin film transistors in positions overlapping the orientation controllers 63 shown in FIG. 1. This technique does not constitute prior art for the present invention. Adoption of this arrangement can prevent light leakage or other negative influences due to disturbances in liquid crystal orientation in regions corresponding to orientation control windows where voltage cannot be controlled, without substantially reducing the aperture ratio. More specifically, light transmitting through a data line 56 attenuates by a fixed ratio. In addition, when in the "normally black mode", the liquid crystal beneath an orientation control window 63 does not allow light to pass through even during voltage application because its initial orientation is maintained. When a data line 56 overlaps a pixel electrode 58 as shown in FIG. 1, for example, the aperture ratio reduces in proportion to the amount of the overlap. However, by arranging the data line 56 to overlap the orientation control window 63 according to the proposed technique, regions originally having strong light-shielding property would be overlaid on one another. In this way, although the light-shielding property in such an overlapped region becomes stronger, the substantial aperture ratio of the pixel can be effectively minimized.

However, when a data line 56 is formed overlapping the orientation control window 63, the wiring length of the data line 56 within a pixel is increased compared to a case when the data line 56 is linearly formed as shown in FIG. 1. Parasitic capacitance between the data line 56 and the pixel electrode 58 therefore becomes increased, and reduction of the potential difference due to the above-described noise may become further notable.

This problem may similarly exist when a data line is formed overlapping pixel electrodes in LCDs other than ones having orientation control windows, such as a LCD with slope portions disposed on an orientation film contacting the liquid crystal for orientation control described in the above-mentioned JPA H07-311383.

SUMMARY OF THE INVENTION

In light of the above, the object of the present invention is to provide a LCD with high contrast wherein a data line is formed overlapping pixel electrodes.

According to the present invention, there is provided a color liquid crystal display having liquid crystal sealed between first and second substrates opposing one another and each having electrodes disposed on its opposing side, wher in said first substrate comprises a plurality of pixel electrodes for driving said liquid crystal and which is spaced apart from one another; a data line for supplying display data to associated electrodes among said plurality of pixel electrodes, said data line arranged overlapping predetermined electrodes among said plurality of pixel electrodes; and color filters formed in an interlayer between said data line and the associated electrodes among said plurality of pixel electrodes.

In the present invention, a common electrode may be formed on the side of said second substrate facing said plurality of pixel electrodes.

According to the above arrangement of the present invention, color filters are formed in an interlayer between a data line and pixel electrodes in a liquid crystal display having the data line disposed overlapping the pixel electrodes. Space is thereby provided between the data line and the pixel electrodes, reducing parasitic capacitance between the data line and the pixel electrodes. Accordingly, changes in pixel electrode potentials can be suppressed to enable application of sufficient voltage to those pixel electrodes, thereby realizing a color liquid crystal display with high contrast.

In another aspect of the present invention, said common electrode includes orientation control windows opened in positions corresponding to each of said plurality of pixel electrodes.

In a further aspect of the present invention, an orientation film is provided on at least the side of said first substrate contacting the liquid crystal, and an orientation control slope face that slants with respect to the plane of the substrates is formed on at least the side of said orientation film contacting the liquid crystal.

According to a still further aspect of the present invention, said liquid crystal has negative anisotropy of dielectric constant.

In the present invention, initial orientation of said liquid crystal may be controlled to a vertical direction with respect to the plane of the substrates.

According to another aspect of the present invention, rubbing-less type vertical orientation films are provided on respective surfaces of said first and second substrates contacting the liquid crystal.

In a liquid crystal display having orientation controllers comprising components such as orientation control windows or orientation control slope faces, a plurality of orientation directions of liquid crystal can be set within a single pixel using the orientation controllers to broaden the viewing angle of the display. By adopting such a structure, a high-contrast, high-quality display having reduced parasitic capacitance between a data line and pixel electrodes can be accomplished with a broad viewing angle.

According to a further aspect of the present invention, said data line is arranged overlapping said orientation control windows within regions of the associated pixel electrodes.

In another aspect of the present invention, there is provided a color liquid crystal display having liquid crystal sealed between first and second substrates opposing one another and each having electrodes disposed on its opposing side, wherein said first substrate comprises a plurality of pixel electrodes for driving said liquid crystal and which is spaced apart from one another; a data line for supplying display data to associated electrodes among said plurality of pixel electrodes, said data line arranged overlapping predetermined electrodes among said plurality of pixel electrodes; and color filters formed in an interlayer between said data line and the associated electrodes among said plurality of pixel electrodes; wherein said second substrate comprises a common electrode including orientation control windows opened through said common electrode in positions corresponding to each of said plurality of pixel electrodes; and said data line overlaps said orientation control windows within regions of the associated pixel electrodes.

In a still further aspect of the present invention, there is provided a color liquid crystal display having liquid crystal sealed between first and second substrates opposing one another and each having electrodes disposed on its opposing side, wherein said first substrate comprises a plurality of pixel electrodes spaced apart from one another for driving said liquid crystal; a data line for supplying display data to associated electrodes among said plurality of pixel electrodes, said data line arranged overlapping predetermined electrodes among said plurality of pixel electrodes; and color filters formed in an interlayer between said data line and the associated electrodes among said plurality of pixel electrodes; wherein an orientation film is provided on at least the side of said first substrate contacting the liquid crystal; an orientation control slope face that slants with respect to plane direction of the substrates is formed on at least the side of said orientation film contacting the liquid crystal; and a region having said orientation control slope face and said data line are overlapped.

When a data line is arranged overlapping orientation control windows, data line wiring tends to become longer compared to when the data line is arranged without overlapping the orientation control windows, further increasing parasitic capacitance between the data line and the pixel electrodes. By providing color filters in an interlayer between the data line and the pixel electrodes according to the present invention to reduced the parasitic capacitance, degradation of contrast resulting from increased wiring length of the data line can be prevented. Degradation of contrast due to lengthy wiring of the data line can be prevented by disposing color filters in an interlayer between the data line and the pixel electrodes similarly in a LCD wherein the positions of the orientation control slope faces and the data line are overlapped.

In a still further aspect of the present invention, each of said plurality of pixel electrodes is connected to said data line to which the pixel electrode is assigned via an associated switch element, and said color filter is absent from a contact region between said switch element and the associated electrode among said plurality of pixel electrodes.

In a device of the present invention wherein a switch element is formed, for example, in an underlying layer of each of the plurality of pixel electrodes, presence of a color filter in each contact region between the switch element and the pixel electrode may require special processes to maintain a favorable connection between the switch element and the pixel electrode positioned over the color filter. When at least a color filter is positioned between the switch element and the pixel electrode, the contact hole for connecting the pixel electrode and the switch element must have a depth passing through the color filter, and this requirement is disadvantageous in obtaining a reliable contact. Moreover, when adopting a manufacturing method in which, before forming the color filter, a contact hole is initially created in an interlayer insulating film formed covering the switch element, color filter material may enter into the created contact hole. Connection between the pixel electrode and the switch element may become deficient if this material is not completely removed from the hole. In light of this situation, formation of a reliable contact between the switch element and the pixel electrode is facilitated by eliminating presence of the color filter in the contact region between the switch element and the pixel electrode.

In the present invention, a thin film transistor may be used as the switch element.

According to another aspect of the present invention, said data line is formed in a layer closer to said first substrate than the associated electrodes among said plurality of pixel electrodes, said data line and the associated electrodes separated by said color filters disposed therebetween.

Operation of liquid crystal is controlled by the potential difference between pixel electrodes and the opposing common electrode. To efficiently apply a voltage to the liquid crystal, it is preferable to dispose the pixel electrodes on the first substrate as close to the liquid crystal as possible. Accordingly, when forming the structure having color filters located in a layer between the pixel electrodes and the data line, the data line is disposed closer to the first substrate, while the pixel electrodes are formed in an overlying layer. In this way, pixel electrodes can be provided closer to the liquid crystal.

In a further aspect of the present invention, at least a portion of said color filter is formed larger than the associated electrode among said plurality of pixel electrode.

According to another aspect of the present invention, an end of at least a portion of said color filter extends outward from an end of the associated electrode among said plurality of pixel electrode by approximately 1 $\mu$m.

At ends of the pixel electrodes, an electric field generated towards the common electrode slightly widens. By extending the ends of the color filters to exceed to the outboard of the ends of the pixel electrodes, light transmitting through the liquid crystal layer in regions where the liquid crystal orientation is controlled by electric field generated around the outboard of pixel end portions can be reliably colored by the color filter extending to this region.

DESCRIPTION OF THE PREFERRED EMBODIMENTS

Figure 3A:
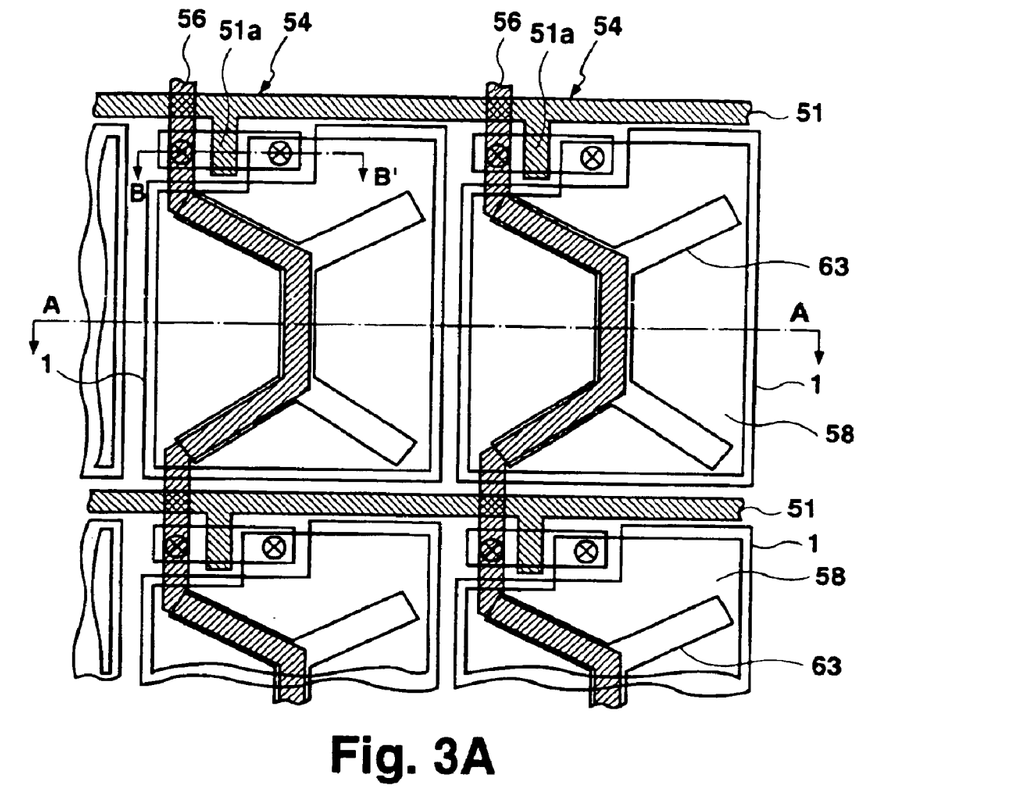
FIG. 3A is a plan view of a color liquid crystal display according to the present invention.
Figure 3B:
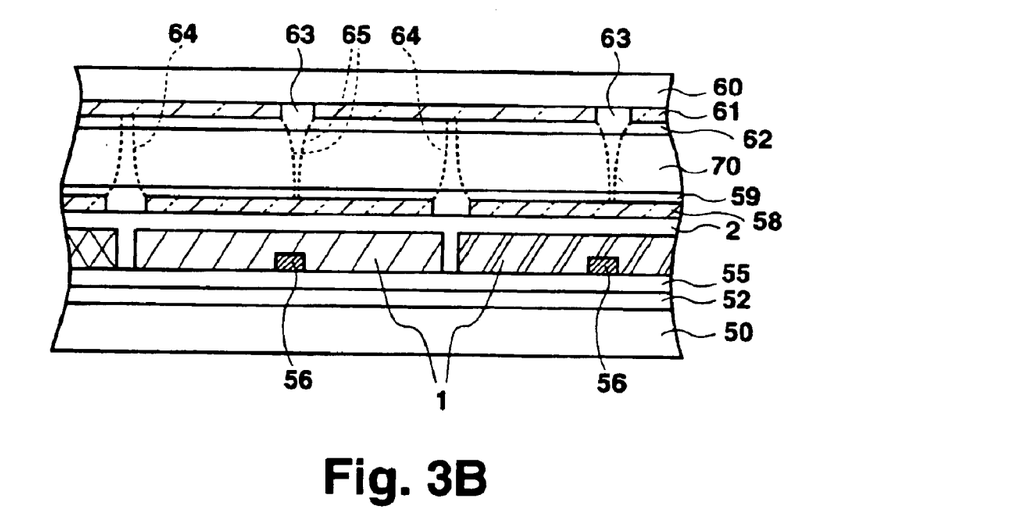
FIG. 3B is a cross-sectional view taken along line A—A of FIG. 3A.
Figure 3C:
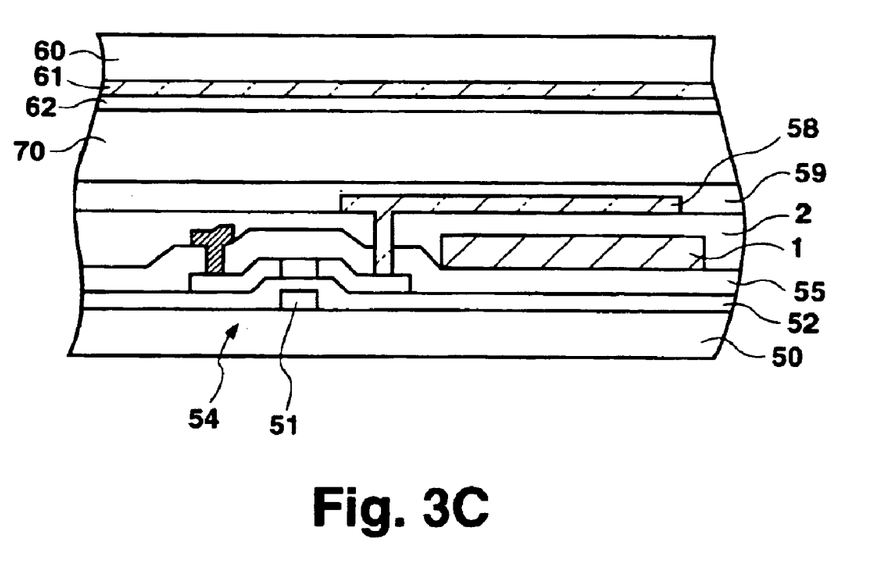
FIG. 3C is a cross-sectional view taken along line B—B of FIG. 3A.

FIG. 3A is a plan view showing a first embodiment of the present invention, and FIG. 3B is a cross-sectional view of FIG. 3A. A gate line 51 having gate electrodes 51a is formed on a first substrate 50, and a gate insulating film 52 is formed covering the gate line 51. Above these, a poly-silicon film is provided in the shape of discrete islands that cross over the gate electrodes 51a. The poly-silicon film is then doped with impurities to, together with the gate electrodes 51a, form TFTs 54. An interlayer insulating film 55 is formed over these components, and a data line 56 is superimposed on the interlayer insulating film 55. Formed covering the data line 56 are color filters 1 each colored either one of red (R), green (G), and blue (B), or alternatively, cyan, magenta, and yellow. A pixel electrode 58 composed of ITO is formed over each color filter 1, with a planarizing film 2 disposed in between. Each pixel electrode 58 is connected to a TFT 54 via a contact hole opened through the interlayer insulating film 55 and the planarizing film 2. The data line 56 is provided underneath the pixel electrodes 58 so as to form a vertical overlap with the pixel electrodes 58. The data line 56 is connected to source regions of TFTs 54 and supplies electric charges to the pixel electrodes 58 when the gate electrodes 51a are selected and the associated TFTs 54 are turned on. Formed over the pixel electrodes 58 is a vertical orientation film 59 made of an organic material such as polyimide or of an inorganic silane material. Rubbing processing is not performed on the vertical orientation film 59.

On a second substrate 60 opposing the first substrate 50, a common electrode 61 composed of ITO or a similar material is formed extending in a region over a plurality of pixel electrodes 58. A vertical orientation film 62 identical to the film 59 on the first substrate 50 is provided over the common electrode 61.

Liquid crystal 70 is sealed between the first and second substrates 50,60. The orientation of liquid crystal is controlled in accordance with the strength of electric field generated by a voltage applied between pixel electrodes 58 and the common electrode 61. On the outboard of the first substrate 50 and the second substrate 60, polarizers (not shown) are arranged such that their polarization axes are perpendicular to one another. Linearly polarized light that travels between the polarizers is modulated while passing through the liquid crystal 70 controlled to different orientations in the respective display pixels. The light is thereby controlled to achieve a desired transmittance.

Orientation control windows 63 may have a shape of two letter Y's connected at their bottoms. In other words, an orientation control window 63 may be an opening created in the center of a pixel that extends towards the sides of the pixel, this opening branching at its both ends towards each of the corners of the pixel electrode 56. The data line 56 is formed overlapping the orientation control windows 63.

A primary difference between the present embodiment and a conventional device is that the color filters 1 are formed in a layer between the pixel electrodes 58 and the data line 56. The color filters 1 of the present embodiment may be formed on the interlayer insulating film 55 by performing transfer printing method separately for each colors of RGB or for all colors at the same time. A conventional planarizing film has a thickness of approximately 1 µm, providing a distance of 1 µm between a conventional pixel electrode 58 and data line 56. A color filter has a thickness of approximately 1.7 µm. In the present embodiment, the color filter 1 is formed between a pixel electrode 58 and a data line 56 such that the distance between the pixel electrode 58 and the data line 56 becomes equal to the sum of the thickness of two layers, namely, approximately 2.7 µm. The color filter may be composed of acrylic resin including pigments, and its dielectric constant $\epsilon$ is almost equivalent to the dielectric constant $\epsilon$ of the planarizing film. Capacitance is inversely proportional to the distance between electrodes. As the distance between the pixel electrode 58 and the data line 56 is enlarged by the amount of thickness of the color filter 1, parasitic capacitance can be reduced.

Parasitic capacitance between a pixel electrode and a data line is proportional to $S \cdot \epsilon / d$, where S is the area of overlap, d is the distance, and $\epsilon$ is the dielectric constant between the pixel electrode and the data line. The overlap area S may be reduced by making the width of the data line narrower, but narrowing the data line width would increase the electric resistance of the data line, causing problems such as deterioration in voltage response of the data line. Accordingly, in order to reduce the parasitic capacitance, the distance between the data line and the pixel electrode should be enlarged.

However, an increase in the thickness of the planarizing film separating the data line and the pixel electrode would reduce light transmittance of the image plane. Further, as the planarizing film may be made of acrylic resin and is often slightly yellow, an increase in the thickness of the planarizing film would give the image plane a yellowish appearance.

On the other hand, a color filter must have a predetermined or larger thickness to provide reliable coloring to the transmitting light. Use of a color filter 1 to provide the desired distance between the pixel electrode 58 and the data line 56 is therefore convenient in simultaneously avoiding decrease in transmittance and achieving reliable coloring.

In addition, formation of the color filters 1 on the first substrate 50 having the pixel electrodes 58 eliminates generation of positional alignment errors that cause misalignment between pixel electrodes 58 and the color filters 1 during lamination of the first and the second substrates 50,60. This effect is convenient for achieving size reduction and high resolution in a LCD.

It is preferable that the color filters 1 are formed without overlapping the contact regions between the TFTs 54 and the pixel electrodes 58. The reason for this is described below.

In a liquid crystal display of the present embodiment, the first substrate may be manufactured by performing the following main processes of (i) forming TFTs 54; (ii) providing an interlayer insulating film 55; (iii) opening contact holes through the interlayer insulating film 55 for connection between each TFT 54 and pixel electrode 58 disposed later; (iv) forming color filters 1; (v) providing a planarizing film 2; (vi) opening contact holes through the planarizing film 2; and (vii) providing ITO in the contact holes and desired regions to form pixel electrodes.

Alternatively, the first substrate may be manufactured by performing the following main processes of (i) forming TFTs 54; (ii) providing an interlayer insulating film 55; (iii) forming color filters 1; (iv) providing a planarizing film 2; (v) opening contact holes through the planarizing film 2 and the interlayer insulating film 55 for connection between each TFT 54 and pixel electrode 58; and (vi) providing ITO in contact holes and desired regions to form pixel electrodes.

Concerning use of the former set of processes, color filter material enters into the contact holes when forming the color filters after opening those contact holes. Removal of the color filter material from the holes is performed by immersion in an organic alkali solution, but it is difficult to completely remove the color filter material within the contact holes because the chemical solution does not easily enter into these contact holes. When the color filter material remains in the contact holes, the contacts between the pixel electrodes 58 and the TFT 54 become deficient.

Concerning use of the latter set of processes, if the color filters 1 extend to positions where the contact holes are formed, each contact hole must be opened penetrating through the planarizing film 2, a color filter 1, and the interlayer isolating film 5 in order to connect the pixel electrodes 58 located on the planarizing film 2 covering the color filter 1 and the TFT 54. Such a contact hole must have an increased depth and is difficult to be reliably created.

By forming the color filters so as to be absent from the contact regions according to the present embodiment, formation of contacts between the pixel electrodes 58 and the TFTs 54 is prevented from being difficult even when the color filters are provided in an interlayer between the pixel electrodes and the data lines.

It is noted that the color filters may become thinner in regions over the data lines 56 by the thickness of the data lines compared to other regions. It is generally undesirable that the thickness of the color filters become non-uniform. However, as the data lines are made of metal and create light-shielding regions, differences in color filter thickness in these regions do not cause any problems with regards to image display.

Figure 4A:
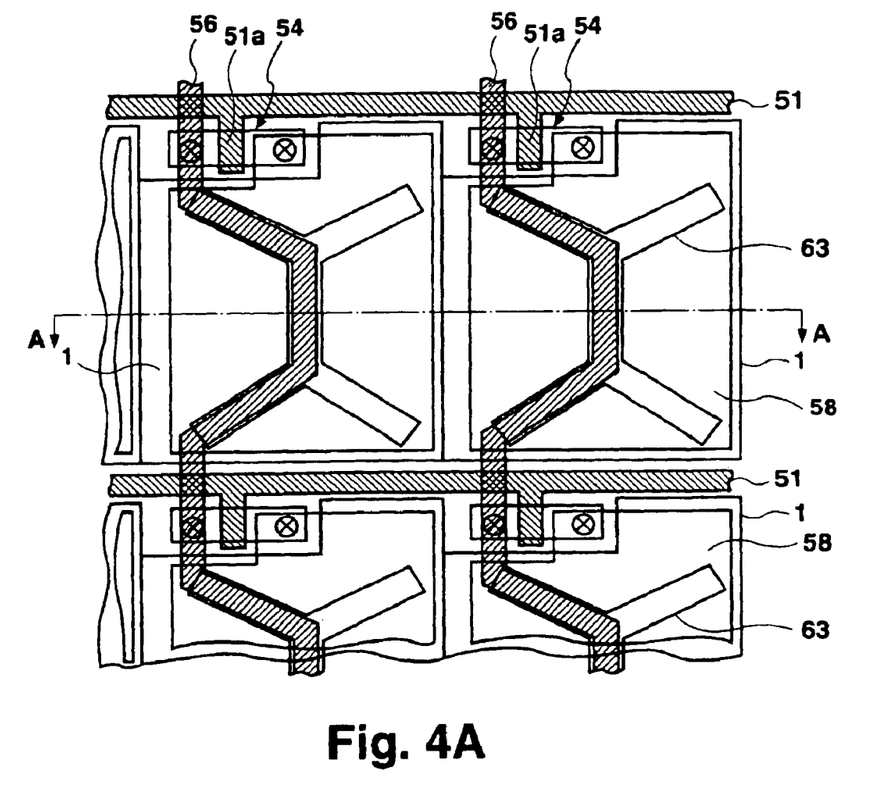
FIG. 4A is a plan view of a color liquid crystal display according to another configuration of the present invention.
Figure 4B:
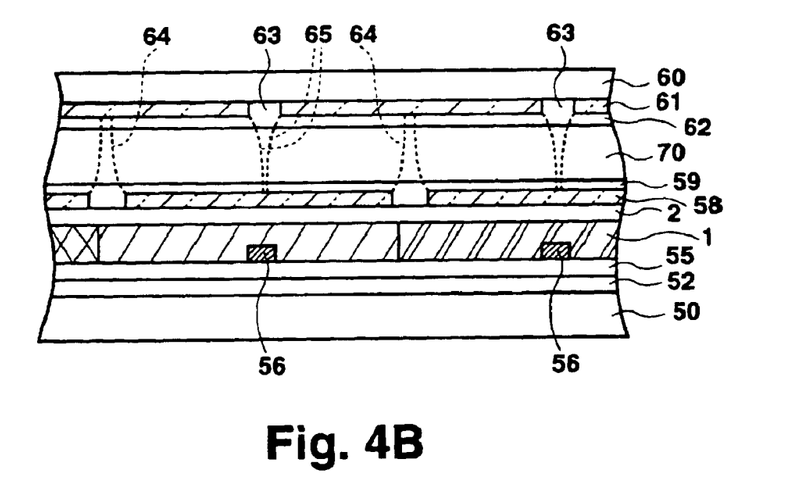
FIG. 4B is a cross-sectional view taken along line A—A of FIG. 4A.

In the LCD of the present embodiment, the liquid crystal orientation is controlled by the curvature of electric field 65 at edge portions of orientation control windows 63 and the curvature of electric field 64 at end portions of pixel electrodes 58. The electric field 64 generated at the pixel electrodes 58 curves outward from the end portions of pixel electrodes 58. Accordingly, the liquid crystal molecules oriented by a voltage applied to the pixel electrodes 58 include not only those located directly above the pixel electrodes 58, but also those located in regions within approximately 1 μm outboard of the end portions of pixel electrodes 58. It is therefore favorable to form the color filters 1 in regions larger by 1 μm than the regions covered by the pixel electrodes 58. The color filters 1 may also be formed without any spaces between one another in pixels arranged within a row, as shown in FIGS. 4A and 4B. It should be noted that orientation control means is not limited to the above-described windows. For example, slope protrusions disclosed in the above-mentioned JPA H07-311383 may alternatively be employed.

Figure 5A:
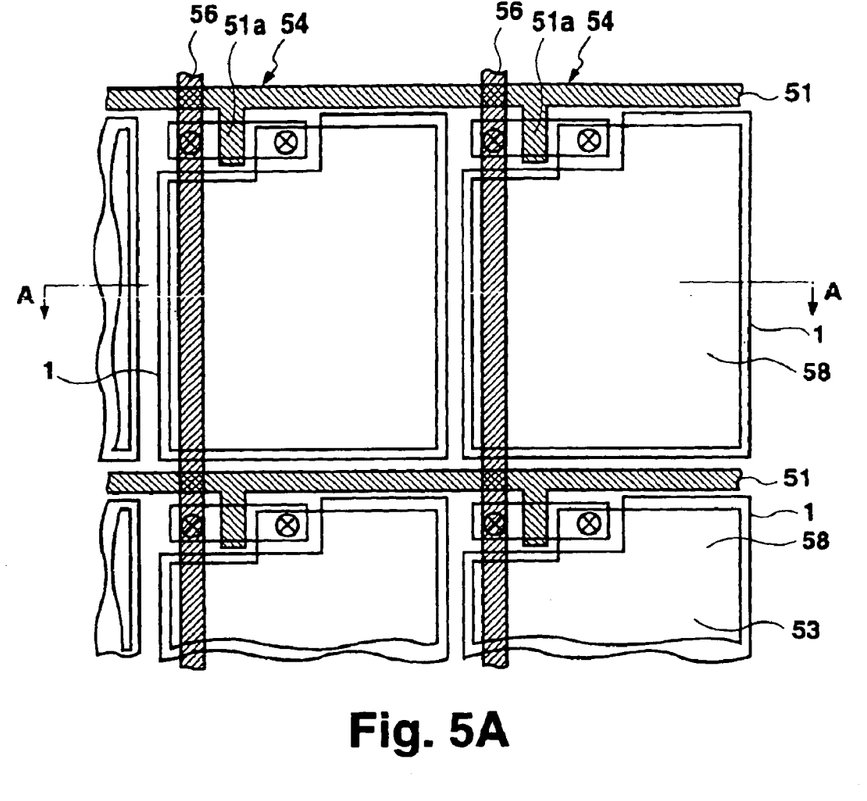
FIG. 5A is a plan view of a color liquid crystal display according to a further configuration of the present invention.
Figure 5B:
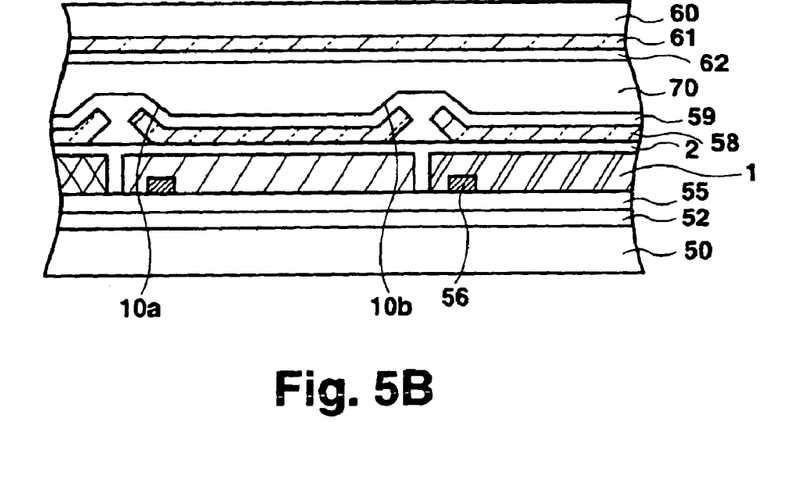
FIG. 5B is a cross-sectional view taken along line A—A of FIG. 5A.

FIG. 5A is a plan view showing a second embodiment of the present invention, and FIG. 5B is a cross-sectional view of FIG. 5A. In this embodiment, orientation control slope portions 10 are provided in the vertical orientation films, in place of orientation control windows, as the orientation control means for controlling liquid crystal orientation. Other structures of this embodiment are very similar to those in the first embodiment. A gate line 51 having gate electrodes 51*a* as its integral components is formed on a first substrate 50. Over the subsequent layer of gate insulating film 52, TFTs 54 are formed. An interlayer insulating film 55 is then provided, followed by data lines 56. Color filters 1 are then formed covering the data lines 56. Above these, pixel electrodes 58 are formed after depositing a planarizing film 2. Each pixel electrode 58 is connected to a TFT 54 via a contact hole opened through the interlayer insulating film 55 and the planarizing film 2. Data lines 56 are provided in positions underneath the pixel electrodes 58 so as to form a vertical overlap with the pixel electrodes 58. Each data line 56 is connected to source regions of TFTs 54 and supplies electric charges to the pixel electrodes 58 when the gate electrodes 51*a* are selected and the associated TFTs 54 are turned on. A vertical orientation film 59 is formed over the pixel electrodes 58.

On a second substrate 60 opposing the first substrate 50, a common electrode 61 composed of ITO or a similar material is formed extending in a region over a plurality of pixel electrodes 58. A vertical orientation film 62 identical to the one disposed on the first substrate 50 is provided over the common electrode 61.

Liquid crystal 70 having negative anisotropy of dielectric constant is sealed between these first and second substrates 50,60. The orientation of liquid crystal is controlled in accordance with the strength of electric field generated by a voltage applied between pixel electrodes 58 and the common electrode 61. On the outboard of the first substrate 50 and the second substrate 60, polarizers (not shown) are arranged such that their polarization axes are perpendicular to one another. Linearly polarized light that travels between the polarizers is modulated while passing through the liquid crystal 70 controlled to different orientations in the respective display pixels. The light is thereby controlled to achieve a desired transmittance.

Differences between the device of this embodiment and that of the first embodiment are that the ends of the pixel electrodes 58 protrude towards the liquid crystal, and orientation control slope faces (slope portions) 10*a*, 10*b* are thereby formed in the vertical orientation film 59 covering the protrusions. Orientation control slope portion 10*a* controls the initial orientation of liquid crystal molecules towards the right in the figure, while orientation control slope portion 10*b* controls the initial orientation of liquid crystal molecules towards the left. The orientation of liquid crystal molecules in the center of the pixels are controlled also during voltage application by the effects conveyed by the liquid crystal molecules located around the slope portions via the continuous property of liquid crystal.

Similarly in this embodiment, the color filters 1 are formed in a layer between the pixel electrodes 58 and the data lines 56. Advantages similar to those obtained in the first embodiment are thereby accomplished, including reduction in parasitic capacitance.

Figure 6A:
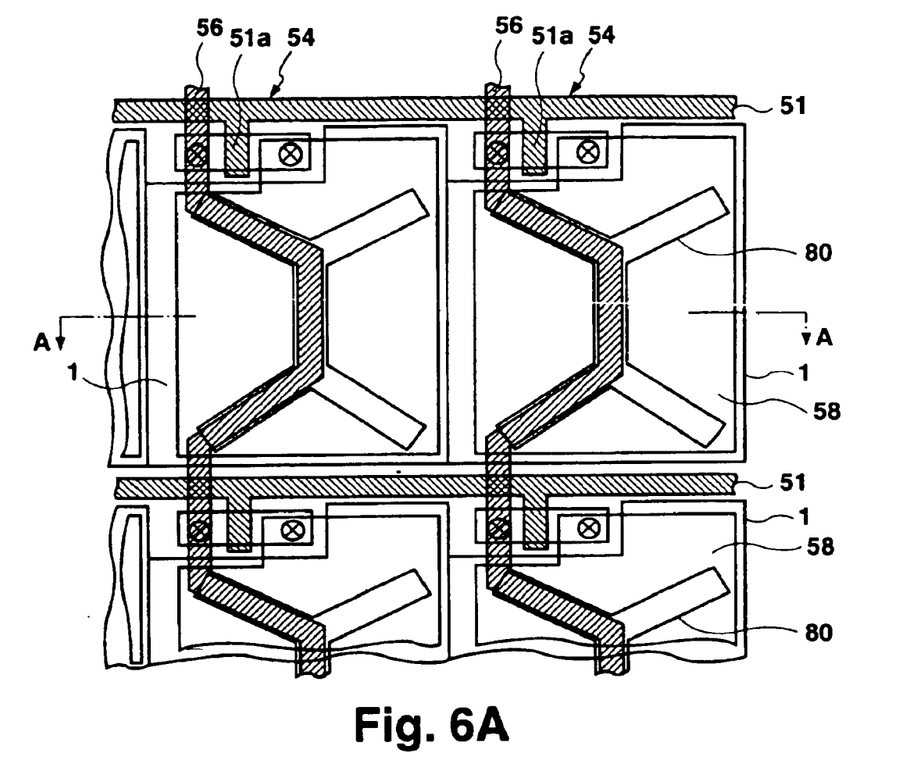
FIG. 6A is a plan view of a color liquid crystal display according to a still further configuration of the present invention.
Figure 6B:
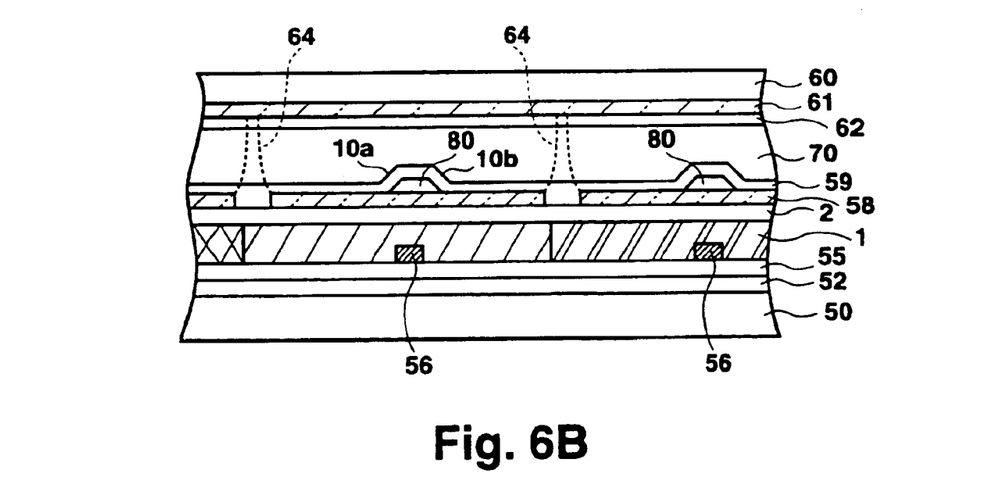
FIG. 6B is a cross-sectional view taken along line A—A of FIG. 6A.

FIG. 6A is a plan view showing a third embodiment of the present invention, and FIG. 6B is a cross-sectional view of FIG. 6A. In place of the orientation control windows of the first embodiment, this embodiment comprises protrusions 80 for creating slope faces in the side contacting the liquid crystal on the first substrate as the controller for liquid crystal orientation. Other structures of this embodiment are very similar to those in the above-described embodiments, and the explanation for those structures will not be repeated here. As shown in FIG. 6B, the protrusions 80 may be formed between the pixel electrodes 58 and the vertical orientation film 59 and formed by an insulator material. In the plan view, the protrusions are formed in a pattern as shown in FIG. 6A. The slope protrusions 80 are arranged so as to overlap within the pixel regions with the data lines 56 underlying the color filters 1. The slope protrusions 80 are not limited to the configuration shown in FIG. 6B, and may be any structure providing slopes in the surface contacting the liquid crystal on the first substrate side that slant with respect to the substrate plane direction. The protrusions may be formed in a layer underneath the pixel electrodes or above the orientation film 59 using an insulator material in a plan pattern as shown in FIG. 6A. Similarly in this embodiment, by providing color filters in a layer between the pixel electrodes and the data lines, reduction in parasitic capacitance between the pixel electrodes and the data lines and other advantages similar to those obtained in the above-described embodiments can be accomplished.

In the present invention, color filters are formed in a layer between pixel electrodes and data lines in a LCD wherein the pixel electrodes and the data lines are formed in an overlap, as described above. Sufficient space is therefore provided between the pixel electrodes and the data lines, reducing parasitic capacitance generating therebetween. Although a scheme using orientation control windows 63 or orientation control slope portions 10 was employed as the orientation controller in the LCDs of the above embodiments, the present invention is not limited to those structures. The present invention may be implemented in a LCD using any configuration as long as the pixel electrodes and the data lines are formed in an overlap.

What is claimed is:

1. A color liquid crystal display having liquid crystal sealed between first and second substrates opposing one another and each having electrodes disposed on its opposing side, said color liquid crystal display comprising a plurality of pixels, wherein said first substrate comprises:

a plurality of pixel electrodes for driving said liquid crystal and which are spaced apart from one another;

a data line for supplying display data to associated electrodes among said plurality of pixel electrodes, said data line arranged overlapping predetermined electrodes among said plurality of pixel electrodes; at a portion other than the edge and color filters formed in an interlayer between said data line and said associated electrodes overlapping said data line among said plurality of pixel electrodes, and wherein orientation dividers for dividing the orientation direction of said liquid crystal are formed on at least one of said first and second substrates in formation regions of the pixels, and said data line overlaps said orientation dividers within formation regions of the associated pixel electrodes.

2. The display defined in claim 1 wherein said liquid crystal has negative anisotropy of dielectric constant.

3. The display defined in claim 1 wherein initial orientation of said liquid crystal is controlled to a vertical direction with respect to the plane of the substrates.

4. The display defined in claim 3, wherein;

a common electrode is formed on a side of said second substrate facing said plurality of pixel electrodes;

said common electrode includes, as said orientation divider, orientation control windows opened through said common electrode in positions corresponding to each of said plurality of pixel electrodes; and rubbing-less type vertical orientation films are provided on respective surfaces of said first and second substrates contacting the liquid crystal.

5. The display defined in claim 3, wherein a sloped protrusion for slanting said liquid orientation is provided as said orientation divider in each formation region of said plurality of pixel electrodes on said first substrate; and rubbing-less type vertical orientation films are provided on respective surfaces of said first and second substrates contacting the liquid crystal.

6. The display defined 1, wherein:

each of said plurality of pixel electrodes is connected to said data line to which the pixel electrode is assigned via an associated switch element; and said color filter is absent from a contact region between said switch element and the associated electrode among said plurality of pixel electrodes.

7. The display defined in claim 1, wherein said data line is formed in a layer closer to said first substrate than the associated electrodes among said plurality of pixel electrodes, said data line and the associated electrodes being separated by said color filters disposed therebetween.

8. The display defined in claim 7, wherein;

switch elements are formed underneath each of said plurality of pixel electrodes;

each of said plurality of pixel electrodes is connected to said data line to which the pixel electrode is assigned via an associated switch element; and said color filter is absent from a contact region between a switch element and an associated electrode among said plurality of pixel electrodes.

9. The display defined in claim 1, wherein an end of at least a portion of said color filter extends outward from an end of the associated electrode among said plurality of pixel electrode by approximately 1 $\mu$m.

10. The display defined in claim 1, wherein at least a portion of said color filter is formed larger than the associated electrode among said plurality of pixel electrodes.

11. The display defined in claim 1, wherein an orientation film is provided at least on a side of said first substrate contacting the liquid crystal; and an orientation control slope face that slants with respect to plane direction of the substrates is formed as said orientation divider at least on a side of said orientation film contacting the liquid crystal.

12. The display defined in claim 11 wherein said orientation film is a vertical orientation film for controlling initial orientation of said liquid crystal to a vertical direction, and said data line is formed in a layer closer to said first substrate than the associated electrodes among said plurality of pixel electrodes, said data line and the associated electrodes being separated by said color filters disposed therebetween.

13. A color liquid crystal display having liquid crystal sealed between first and second substrates opposing one another and each having electrodes disposed on its opposing side, said color liquid crystal display comprising a plurality of pixels, wherein said first substrate comprises:

a plurality of pixel electrodes for driving said liquid crystal and which is spaced apart from one another;

a data line for supplying display data to associated electrodes among said plurality of pixel electrodes, at a portion other than the edge said data line arranged overlapping predetermined electrodes among said plurality of pixel electrodes; and color filters formed in an interlayer between said data line and said associated electrodes overlapping said data line among said plurality of pixel electrodes, and wherein a planarizing insulating layer is provided in an interlayer between said color filters and said plurality of pixel electrodes, orientation dividers for dividing the orientation direction of said liquid crystal are formed on at least one of said first and second substrates in formation regions of the pixels, and said data line is arranged to overlap said orientation divider within formation regions of the associated pixel electrodes.

14. The display defined in claim 13, wherein:

a common electrode is formed on a side of said second substrate facing said plurality of pixel electrodes;

said common electrode includes, as said orientation divider, orientation control windows opened through said common electrode in positions corresponding to each of said plurality of pixel electrodes; and rubbing-less type vertical orientation films are provided on respective surfaces of said first and second substrates contacting the liquid crystal.

15. The display defined in claim 13, wherein a sloped protrusion for slanting said liquid crystal orientation is provided as said orientation divider in each formation region of said plurality of pixel electrodes on said first substrate; and rubbing-less type vertical orientation films are provided on respective surfaces of said first and second substrates contacting the liquid crystal.

16. The display defined in claim 13, wherein an orientation film is provided at least on a side of said first substrate contacting the liquid crystal; and an orientation control slope face that slants with respect to plane direction of the substrates is formed as said orientation divider at least on a side of said orientation film contacting the liquid crystal.

17. A color liquid crystal display having liquid crystal sealed between first and second substrates opposing one another and each having electrodes disposed on its opposing side, said color liquid crystal display comprising a plurality of pixels, wherein said first substrate comprises:

a plurality of pixel electrodes for driving said liquid crystal and which is spaced apart from one another;

a data line for supplying display data to associated electrodes among said plurality of pixel electrodes, at a portion other than the edge said data line arranged overlapping predetermined electrodes among said plurality of pixel electrodes; and color filters formed in an interlayer between said data line and said associated electrodes overlapping said data line among said plurality of pixel electrodes, and wherein a planarizing insulating layer is provided in an interlayer between said color filters and said plurality of pixel electrodes, and an end of at least a portion of said color filter extends outward from an end of the associated electrode among said plurality of pixel electrode by approximately 1 $\mu$m.

18. A color liquid crystal display having liquid crystal sealed between first and second substrates opposing one another and each having electrodes disposed on its opposing side, said color liquid crystal display comprising a plurality of pixels, wherein said first substrate comprises:

a plurality of pixel electrodes for driving said liquid crystal and which is spaced apart from one another;

a data line for supplying display data to associated electrodes among said plurality of pixel electrodes, at a portion other than the edge said data line arranged overlapping predetermined electrodes among said plurality of pixel electrodes; and color filters formed in an interlayer between said data line and said associated electrodes overlapping said data line among said plurality of pixel electrodes, and wherein a planarizing insulating layer is provided in an interlayer between said color filters and said plurality of pixel electrodes, and at least a portion of said color filter is formed larger than the associated electrode among said plurality of pixel electrodes.

* * * * *